US 6,947,080 B2

(12) United States Patent
Ikeda

(10) Patent No.: US 6,947,080 B2
(45) Date of Patent: Sep. 20, 2005

(54) DEVICE FOR IMAGE PROCESSING, METHOD OF ADJUSTING WHITE-BALANCE, AND COMPUTER PRODUCTS

(75) Inventor: Junichi Ikeda, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 953 days.

(21) Appl. No.: 09/894,764

(22) Filed: Jun. 29, 2001

(65) Prior Publication Data

US 2002/0018129 A1 Feb. 14, 2002

(30) Foreign Application Priority Data

Jun. 30, 2000 (JP) .................................. 2000-200270

(51) Int. Cl.$^7$ ............................................... H04N 9/73
(52) U.S. Cl. ................................................... 348/223.1
(58) Field of Search .................... 348/223.1, 222.1, 348/225.1

(56) References Cited

U.S. PATENT DOCUMENTS 4,922,330 A * 5/1990 Saito et al. ............... 348/225.1
5,481,302 A * 1/1996 Yamamoto et al. ........ 348/223.1
6,075,562 A   6/2000 Sakaguchi et al.
6,670,987 B1 * 12/2003 Taura ....................... 348/223.1

FOREIGN PATENT DOCUMENTS

| JP | 2-26193  | 1/1990 |
| JP | 7-143497 | 6/1995 |
| JP | 8-16926  | 2/1996 |

* cited by examiner

Primary Examiner—Wendy R. Garber
Assistant Examiner—Gary C. Vieaux
(74) Attorney, Agent, or Firm—Oblon, Spivak, McClelland, Maier & Neustadt, P.C.

(57) ABSTRACT

The controller calculates white-detection parameters that form the narrowest range with the highest luminance under a condition that the accumulated values of the respective colors are not reduced to "0", sets the resulting parameter in the white-detection circuit, and based upon the accumulated values of the respective colors that are output when the white-detection parameters that form the narrowest range with the highest luminance under the condition that the accumulated values of the respective colors are not reduced to "0" have been preset in the white-detection circuit, calculates the gains of R and B of the white-balance adjusting circuit, and sets the resulting gains in the white-balance adjusting circuit.

9 Claims, 6 Drawing Sheets

DEVICE FOR IMAGE PROCESSING, METHOD OF ADJUSTING WHITE-BALANCE, AND COMPUTER PRODUCTS

FIELD OF THE INVENTION

The present invention relates to a technology for processing image/s picked-up by image-pickup devices such as digital video or still cameras.

BACKGROUND OF THE INVENTION

A white balance control device used for an image processing device using CCDs as image pickup elements provides a technique by which changes in hue of an output signal of CCDs due to color temperatures of a light source are corrected without giving any congruous feeling to the human eyes, and forms an essential function for a digital camera, etc., using CCDs.

Conventionally, the white balance control device is mainly classified into two systems. One system is referred to as an external measuring system in which an external color temperature sensor is installed separately from an image pickup system so that, based upon its output signal, the hue of the pickup system is corrected. The other system is referred to as a TTL (Through the Lens) system in which color information of an image picked up by the image pickup system is utilized to find the amount of correction for the hue.

The latter system is further classified into an entire screen averaging system for correcting the sum total of all the color differences in a picked-up image to "0" in accordance with rules obtained through experiences, and a white-detection system in which white areas are extracted from an image and color differences in these areas are corrected to "0". The external measuring system requires an exclusively-used sensor, and the entire screen averaging system is susceptible to great errors; therefore, at present, the white-detection system has been widely used.

The conventional white-detection method will be explained here. For example, Japanese Patent Application Laid-Open No. H2-26193 discloses a white balance device and white detection method. According to this method values of Y, Cr, Cb in color information are used so as to find values Cr/Y, Cb/Y, and in the case when the calculated values of Cr/Y and Cb/Y are included in a fixed range along a characteristic curve of black-body radiation on the Cb/Y-Cr/Y coordinates, the corresponding pixel is judged as white. In this case, Y represents luminance, Cr represents color-difference R–Y, and Cb represents color-difference value B–Y of a pixel.

When the values of Cr/Y, Cb/Y are found from the values of Y, Cr, Cb obtained from the CCDs of an image processing device, the value with respect to pixels having the same color is virtually determined in a univocal manner on the Cb/Y-Cr/Y coordinates. Moreover, the characteristic of an object along black-body radiation due to the color temperature of the light source, which relates to the white balance control, is indicated by a curve, as shown in FIG. 8, on the Cb/Y-Cr/Y coordinates.

Therefore, an area showing Cr/Y and Cb/Y values close to this curve is more likely to be white. In the white detection method described in the above-mentioned JP No. H2-26193, an area showing Cr/Y and Cb/Y values that are contained in an area formed by surrounding the black-body radiation characteristic curve with four straight lines, as indicated by a portion with slanting lines in FIG. 8 in an picked-up image, is detected as a white area, and the hue is corrected so as to set the color difference in this area to "0", thereby carrying out a white balance adjusting process.

In the case when no white area exists in a picked-up image, the white-detection condition is alleviated so as to find the amount of correction by using color information of the entire image, and in this case, a limitation is added to the amount of correction so as not to apply an excessive correction on a chromatic color subject.

However, in the method disclosed by the above-mentioned JP No. H2-26193, since the values Cr/Y, Cb/Y that are set to fixed values independent of the luminance of image data are used with respect to a white subject, it has an advantage in which it is possible to reduce errors caused by erroneously judging a deep chromatic color subject with low luminance as white. However, if white subjects and chromatic color subjects having colors close to the characteristic of black-body radiation, such as skin colors, exist in a mixed manner, areas other than white might be judged as white, resulting in errors in white-detection.

SUMMARY OF THE INVENTION

It is an object of this invention to provide an image processing device which can carry out an accurate white balance adjustment even if white subjects and chromatic color subjects having colors close to the characteristic of black-body radiation, such as skin colors, exist in a mixed manner. It is another object of this invention to provide a method of adjusting the white balance. It is still another object of this invention to provide a computer-readable recording medium that stores a computer program for realizing the method according to the present invention on a computer.

The image processing device according to one aspect of the present invention comprises a white-balance adjusting unit which executes a white-balance adjusting process by adjusting gains of at least image data of two colors of the color image data; a white-detection unit which, from the color image data that have been subjected to the white-balance adjusting process, detects pixels that are located within a range of a presettable white-detection parameter, and accumulates the image data of the pixels of each color that have been detected so as to output the resulting accumulated value for each color; a white-detection parameter setting unit which calculates a white-detection parameter that sets the narrowest area with the highest luminance under a condition that the accumulated value of each color is not reduced to "0", and sets the resulting parameter in the white-detection unit, and a white-balance control unit which, based upon the accumulated value for each of the colors in the case when the white-detection parameter that sets the narrowest area with the highest luminance under the condition that the accumulated value of each color is not reduced to "0" has been preset in the white-detection unit, calculates gain values of at least two colors of the gain-adjusting unit so as to feed-back control the gain-adjusting unit by setting the resulting values in the gain-adjusting unit.

Furthermore, it is preferable that the white-detection parameter setting unit sets a luminance detection region of the white-detection parameter at the narrowest area with the highest luminance during the initial setting time, and in the case when the accumulated value of each color is "0", allows the luminance detection area of the white-detection parameter to shift toward the low luminance side with a predetermined width so that the white-detection unit is feed-back controlled so as to detect the pixel having the highest luminance within the screen.

Furthermore, it is preferable that, in the case when, upon allowing the luminance detection region of the white-detection parameter to shift toward the low luminance side, the accumulated value of each color becomes no longer "0" or the luminance detection region of the white-detection parameter has reached the lowest value, the white-detection parameter is reset to the parameter at the time of initial setting.

Moreover, the method of adjusting white-balance according to another aspect of the present invention comprises the steps of adjusting white-balance by adjusting gains of at least image data of two colors of the color image data; from the color image data that have been subjected to the white-balance adjusting process, detecting pixels that are located within a range of a presettable white-detection parameter, and accumulating the image data of the pixels of each color that have been detected so as to output the resulting accumulated value for each color; calculating a white-detection parameter that sets the narrowest area with the highest luminance under a condition that the accumulated value of each color is not reduced to "0", and setting the resulting parameter; and based upon the accumulated value for each of the colors in the case when the white-detection parameter that sets the narrowest area with the highest luminance under the condition that the accumulated value of each color is not reduced to "0" has been set, calculating gain values of at least two colors and setting the resulting values so as to carry out a feed-back control process.

Furthermore, the method of adjusting white-balance according to still another aspect of the present invention, at the time of initial setting, setting a parameter of a luminance detection region of a white-detection parameter to a narrow area corresponding to the highest luminance; executing a white-balance adjusting process by adjusting gains of at least image data of two colors of the color image data; from the color image data that have been subjected to the white-balance adjusting process, detecting pixels that are located within a range of a presettable white-detection parameter, and accumulating the image data of the pixels of each color that have been detected so as to output the resulting accumulated value for each color; calculating a white-detection parameter that sets the narrowest area with the highest luminance under a condition that the accumulated value of each color is not reduced to "0", and setting the resulting parameter; based upon the accumulated value for each of the colors in the case when the white-detection parameter that sets the narrowest area with the highest luminance under the condition that the accumulated value of each color is not reduced to "0" has been set, calculating gain values of at least two colors and setting the resulting values so as to carry out a feed-back control process; and in the case when the accumulated value of each color is "0", allowing the luminance detection area of the white-detection parameter to shift toward the low luminance side with a predetermined width.

Furthermore, the method of adjusting white-balance according to still another aspect of the present invention, at the time of initial setting, setting a parameter of a luminance detection region of a white-detection parameter to a narrow area corresponding to the highest luminance; executing a white-balance adjusting process by adjusting gains of at least image data of two colors of the color image data; from the color image data that have been subjected to the white-balance adjusting process, detecting pixels that are located within a range of a presettable white-detection parameter, and accumulating the image data of the pixels of each color that have been detected so as to output the resulting accumulated value for each color; calculating a white-detection parameter that sets the narrowest area with the highest luminance under a condition that the accumulated value of each color is not reduced to "0", and setting the resulting parameter; based upon the accumulated value for each of the colors in the case when the white-detection parameter that sets the narrowest area with the highest luminance under the condition that the accumulated value of each color is not reduced to "0" has been set, calculating gain values of at least two colors and setting the resulting values so as to carry out a feed-back control process; in the case when the accumulated value of each color is "0", allowing the luminance detection area of the white-detection parameter to shift toward the low luminance side with a predetermined width; and in the case when the accumulated value of each color becomes no longer "0" or the luminance detection region of the white-detection parameter has reached the lowest value, resetting the white-detection parameter to the parameter at the time of initial setting.

The computer readable recording medium according to still another aspect of the present invention stores a computer program which when executed realizes the method according to the present invention.

Other objects and features of this invention will become apparent from the following description with reference to the accompanying drawings.

DESCRIPTION OF THE PREFERRED EMBODIMENTS

Embodiments of a digital camera to which the image processing device and the white-balance adjusting method in accordance with the present invention are applied will be explained in detail below with reference to accompanying drawings.

Figure 1:
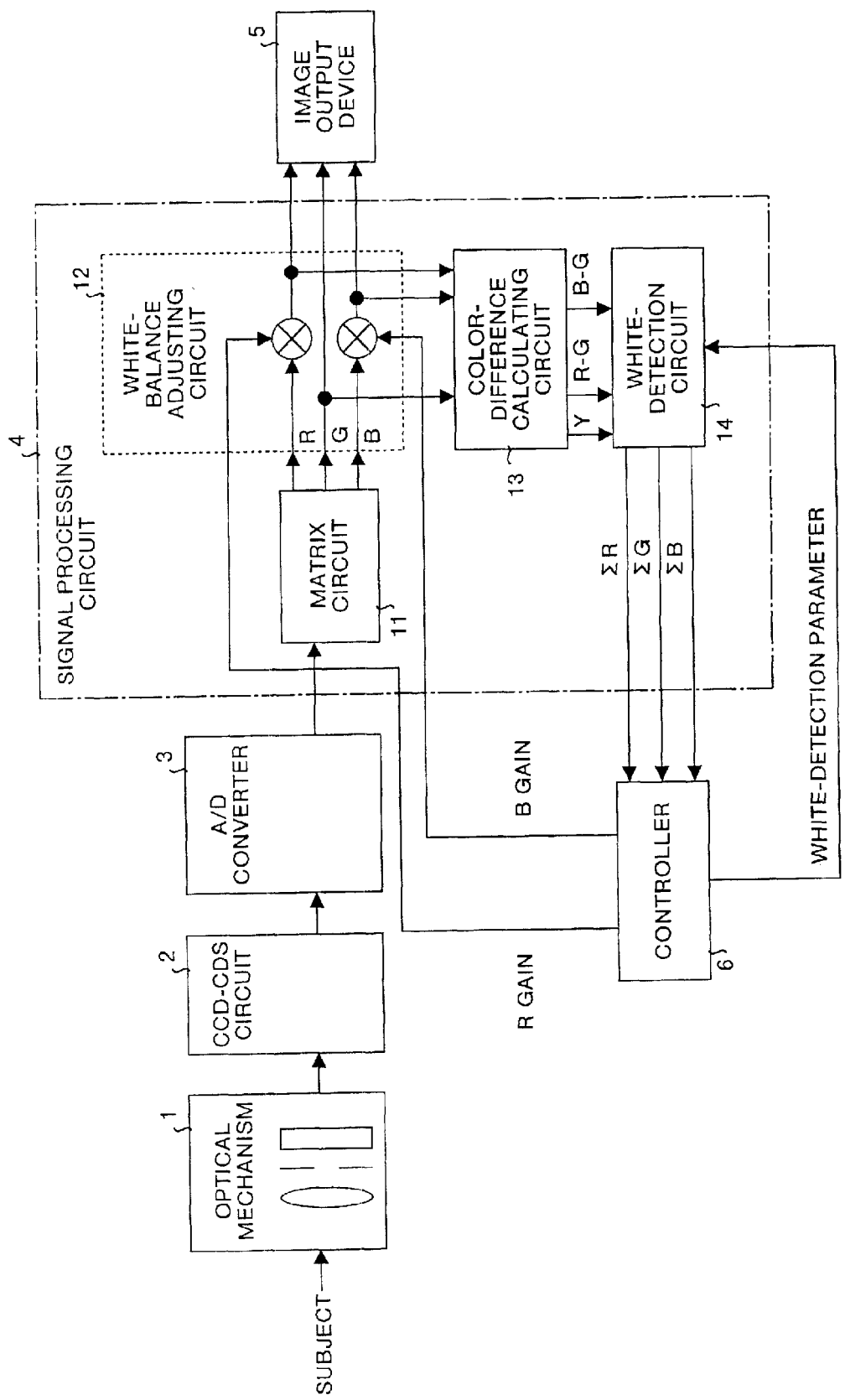
FIG. 1 is a block diagram of a digital camera in accordance with one embodiment of the present invention.

FIG. 1 is a block diagram that shows a digital camera in accordance with one embodiment of the present invention. This digital camera is comprised of the optical mechanism 1, CCD-CDS circuit 2, A/D converter 3, signal processing circuit 4, image output device 5, and the controller 6.

The optical mechanism 1 includes a lens, diaphragm, shutter, etc., so as to converge an image of a subject and to adjust the focus and the dose of exposure. The CCD-CDS circuit 2 converts the image of the subject that has been converged on a color CCD surface under appropriate exposing conditions adjusted by the optical mechanism 1, to an electric signal (an analog signal) by using the CCD and CDS. The A/D converter 3 converts the analog signal input from the CDD-CDS circuit 2 to a digital data. The signal processing circuit 4 carries out a color interpolation on the digital data output by the A/D converter 3 to generate color image data. The signal processing circuit 4 also carries out a white-balance adjusting process and operations to find a color accumulated value used for white-detection and outputs the result, in accordance with a parameter set by the controller 6.

The image output device 5 carries out operations such as a displaying process of image data that has been white-balance adjusted or a writing process of this to a storage medium. The controller 6 is constituted by a microprocessor for executing a control program stored in a ROM, the ROM for storing the control program, etc. The controller 6 calculates set values of R gain and B gain used for adjusting white balance based upon the color accumulated value calculated in the signal processing circuit 4 and a value of the white-detection parameter used for the white-detection process within the signal processing circuit 4 in the next exposure, thereby carrying out a feed-back control on the signal processing circuit 4.

The signal processing circuit 4 is provided with the matrix circuit 11, white balance adjusting circuit 12, color-difference calculating circuit 13, and the white-detection circuit 14. The matrix circuit 11 carries out a color interpolation operation process on image data that has passed through color filters such as R, G, B, C, M and Y of the CCD-CDS circuit 2 to generate R, G, B color image data and outputs this to the white balance adjusting circuit 12.

The white balance adjusting circuit 12 carries out a gain adjusting process on the R, B data of the R, G, B color image data input from the matrix circuit 11 so as to execute a white-balance adjusting process, and outputs the R, G, B data that have been white-balance adjusted to the color-difference calculating circuit 13 and the image output device 5. At this time, the adjusting coefficients, that is, the values of R gain and B gain are set by the controller 6.

The color-difference calculating circuit 13 converts the R, G, B data that have been white-balance adjusted to luminance data Y and color-difference data R-G, B-G and outputs these to the white-detection circuit 14. Here, the luminance data Y is converted based upon the following equation (1)

$$Y = 0.3 \times R + 0.6 \times G + 0.1 \times B \tag{1}$$

The white-detection circuit 14 detects pixels that satisfy three conditions represented by the following equations (2) to (4) from the entire image, in accordance with six values of white-detection parameters, $Y\_min$ (Y lowermost value), $Y\_max$ (Y uppermost value), $R\text{-}G\_min$ (R-G lowermost value), $R\text{-}G\_max$ (R-G uppermost value), $B\text{-}G\_min$ (B-G lowermost value) and $B\text{-}G\_max$ (B-G uppermost value) that are set by the controller 6; thus, it respectively calculates accumulated values $\Sigma R$, $\Sigma G$ and $\Sigma B$ of the R, G, B data of the entire pixels that have been detected, and outputs these to the controller 6.

$$Y\_max \geq Y \geq Y\_min \tag{2}$$

$$R\text{-}G\_max \geq R\text{-}G \geq R\text{-}G\_min \tag{3}$$

$$B\text{-}G\_max \geq B\text{-}G \geq B\text{-}G\_min \tag{4}$$

Figure 2:
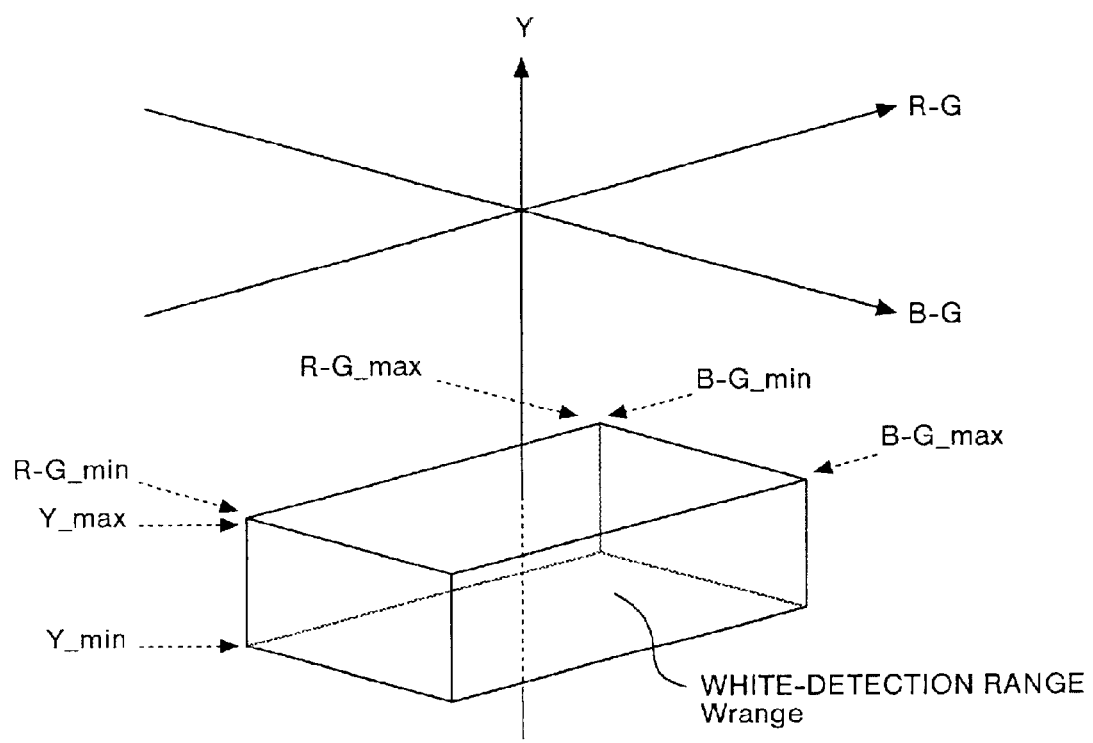
FIG. 2 is a drawing that explains a white-detection range of the white-detection circuit shown in FIG. 1.

FIG. 2 is a drawing that explains the white-detection range of the white-detection circuit 14. This Figure indicates the three-dimensional coordinates of the color difference planes R-G, B-G and the luminance Y, and the white-detection range Wrange, specified by the white-detection parameters $Y\_min$ (Y lowermost value), $Y\_max$ (Y uppermost value), $R\text{-}G\_min$ (R-G lowermost value), $R\text{-}G\_max$ (R-G uppermost value), $B\text{-}G\_min$ (B-G lowermost value) and $B\text{-}G\_max$ (B-G uppermost value), forms an area having a square pillar shape. The white-detection circuit 14 respectively calculates the accumulated values $\Sigma R$, $\Sigma G$ and $\Sigma B$ of the R, G, B data of the pixels having values contained within the white-detection range Wrange (within the square pillar range), and outputs these to the controller 6.

In a digital camera having the above arrangement, the controller 6 functions as a white-detection parameter setting unit and a white-balance control unit, the white-balance adjusting circuit 12 functions as a white-balance adjusting unit, and the white-detection circuit 14 functions as a white-detection unit.

The functions of the controller 6 will be explained in detail now. As described above, the controller 6 calculates the values of R gain and B gain of the white-balance adjusting circuit 12 and the white-detection parameter of the white-detection circuit 14, and sets the values of R gain and B gain of the white-balance adjusting circuit 12 and the white-detection parameter of the white-detection circuit 14.

The R gain and B gain are calculated in the following manner. The controller 6 calculates the R gain and B gain of the white balance adjusting circuit 12 based upon the color accumulated value data $\Sigma R$, $\Sigma G$ and $\Sigma B$ input from the white-detection circuit 14, in accordance with the following equations (5) and (6):

$$R \text{ gain} = \Sigma G / \Sigma R \tag{5}$$

$$B \text{ gain} = \Sigma G / \Sigma B \tag{6}$$

The controller 6 feeds the results of operations (R gain, B gain) back to the white balance adjusting circuit 12 of the signal processing circuit 4 at the time of the next exposure so that a white-balance adjusting process, which allows $\Sigma R$, $\Sigma G$ and $\Sigma B$ to be satisfied, that is, sets the image data in the area detected by the white-detection circuit 14 to white, is carried out.

Figure 3:
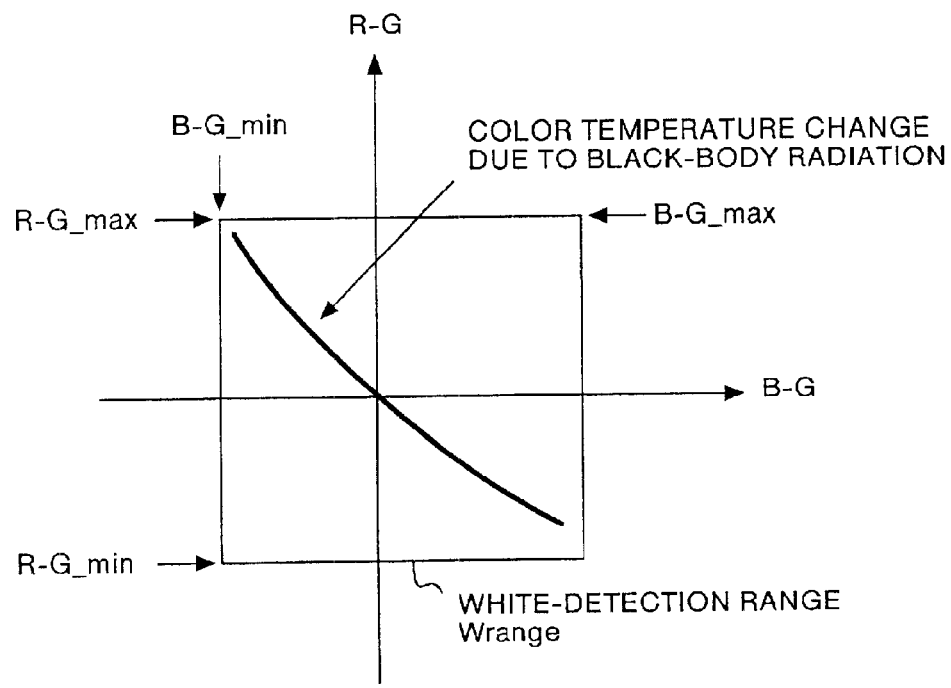
FIG. 3 is a drawing that shows a color-difference plane (R-G, B-G) in the white-detection range Wrange.

The white-detection parameter is determined as follows. First, an explanation will be given of an initial setting of the white-detection parameter upon activating the camera. FIG. 3 shows the color-difference plane (R-G, B-G) of the white-detection range Wrange. As illustrated in FIG. 3, the white-detection parameters related to the color-difference, $R\text{-}G\_min$ (R-G lowermost value), $R\text{-}G\_max$ (R-G uppermost value), $B\text{-}G\_min$ (B-G lowermost value) and $B\text{-}G\_max$ (B-G uppermost value), are set as an area that is as small as possible, while it contains all the locuses of a curve along which the color of a white subject varies in accordance with the black-body radiation within the range of color temperature on which the white balance control is carried out.

Figure 4:
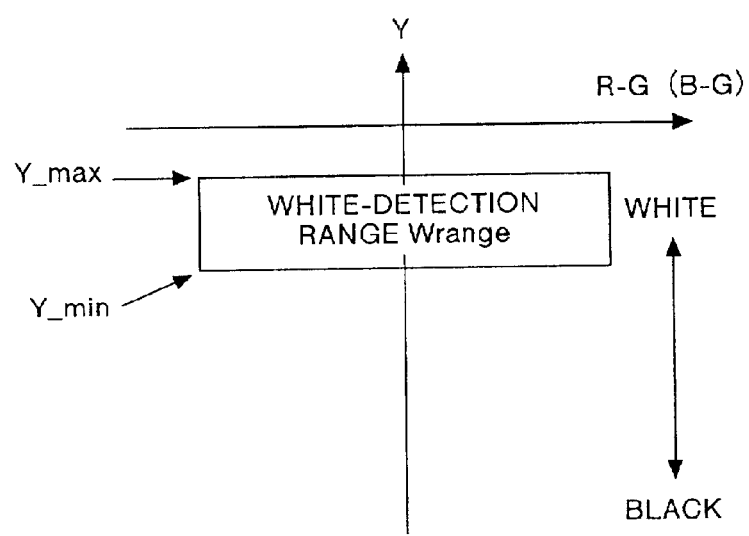
FIG. 4 is a drawing that shows a detection area (luminance detection range) in the luminance direction of the white-detection range Wrange.

FIG. 4 illustrates a detection area (luminance detection range) in the luminance direction of the white-detection range Wrange. As shown in FIG. 4, the white-detection parameters related to luminance, $Y\_min$ (Y lowermost value) and $Y\_max$ (Y uppermost value), are set as an area that is as small as possible, while it corresponds to white without containing a low luminance achromatic color area of gray to black.

Figure 5:
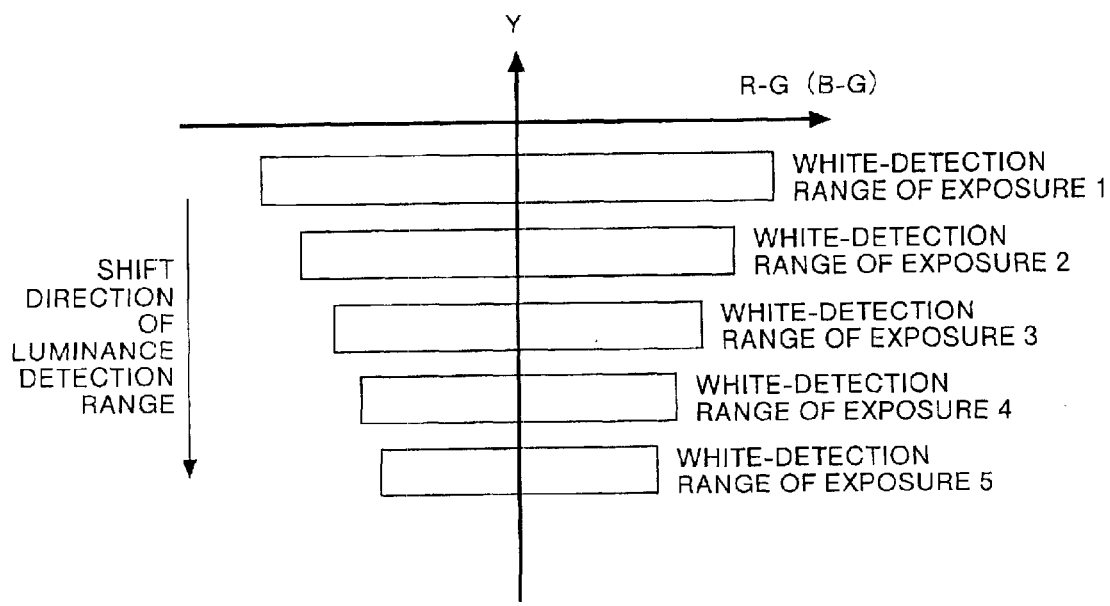
FIG. 5 is for explaining shifting process of the white-detection parameter and particularly shows the white-detection range Wrange viewed in the luminance direction.

An explanation will be given of a case in which the white-detection parameter is shifted. FIG. 5 is a drawing that explains the shift of the white-detection parameter, and in this Figure, the white-detection range in the white-detection circuit 14 is viewed from the luminance direction. In the initial setting of the white-detection parameter, in the case when the color accumulated values, ΣR, ΣG and ΣB, input from the white-detection circuit 14, are "0", the luminance detection range is shifted with a predetermined fine width in the low luminance direction, as shown in FIG. 5. In this case, as the luminance becomes smaller in the image data, the color-difference in color offset with respect to the color temperature change in a white subject also becomes smaller; therefore, the white-detection range in the color-difference direction is simultaneously narrowed. This Figure shows a case in which the luminance detection range is shifted with a fine width in the low luminance direction successively with respect to exposure 1, exposure 2, exposure 3, exposure 4 and exposure 5, with the white-detection range being simultaneously narrowed in the color-difference direction.

The controller 6 repeats exposures while shifting the luminance detection range of the white-detection parameter in the low-luminance direction with the detection range of the white-detection parameter in the color-difference direction being narrowed until the color accumulated values, ΣR, ΣG and ΣB, input from the white-detection circuit 14 of the signal processing circuit 4, has been output; thus, in the case when the color accumulated values, ΣR, ΣG and ΣB, take any values other than "0", that is, some pixels are contained in the white-detection range, it resets the white-detection parameter to the initial set values in the high luminance area, and carries out operations on the R gain and B gain based upon the color accumulated values, ΣR, ΣG, ΣB, input from the white-detection circuit 14, thereby re-setting the R gain and B gain with respect to the white balance adjusting circuit 12.

Moreover, in the case when the luminance detection range of the white-detection parameter has reached the lower limit without the outputs of the color accumulated values, ΣR, ΣG, ΣB, the controller 6 resets the white-detection parameter to the initial set values, and again allows the white-detection circuit 14 to resume the white-detection operation from the high luminance side. By repeating the above processes, the operations of the R gain and B gain in the controller 6 are always applied to the area having the highest luminance within the screen.

Figure 6:
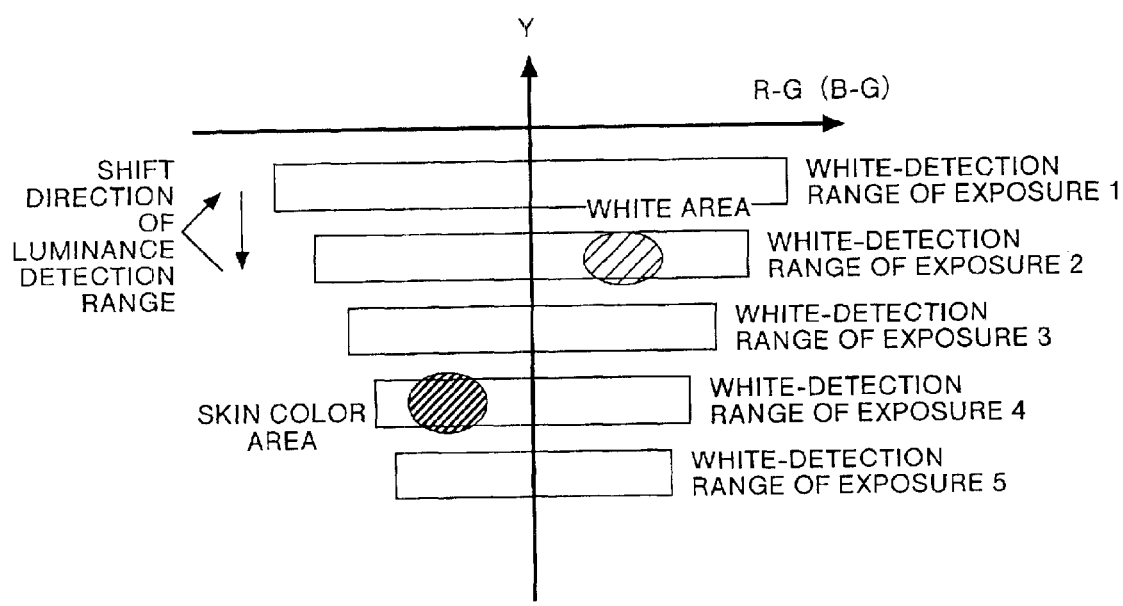
FIG. 6 is for explaining shifting process of the white-detection parameter when the subject includes skin color, and particularly shows the white-detection range Wrange viewed in the luminance direction.

FIG. 6 is a drawing that shows the white-detection range in the white-detection circuit 14 of the signal processing circuit 4 that is viewed from the luminance direction and that, for example, shows a scene in which white subjects and skin chromatic color subjects exist in a mixed manner. In the present invention, white is retrieved successively from the high luminance side; therefore, since the white-detection range is reset to the highest luminance area at the time when the color accumulated values have been output in exposure 2, the color accumulated value in the skin color area is not output, thereby making it possible to prevent errors with respect to skin colors in the prior art.

Figure 7:
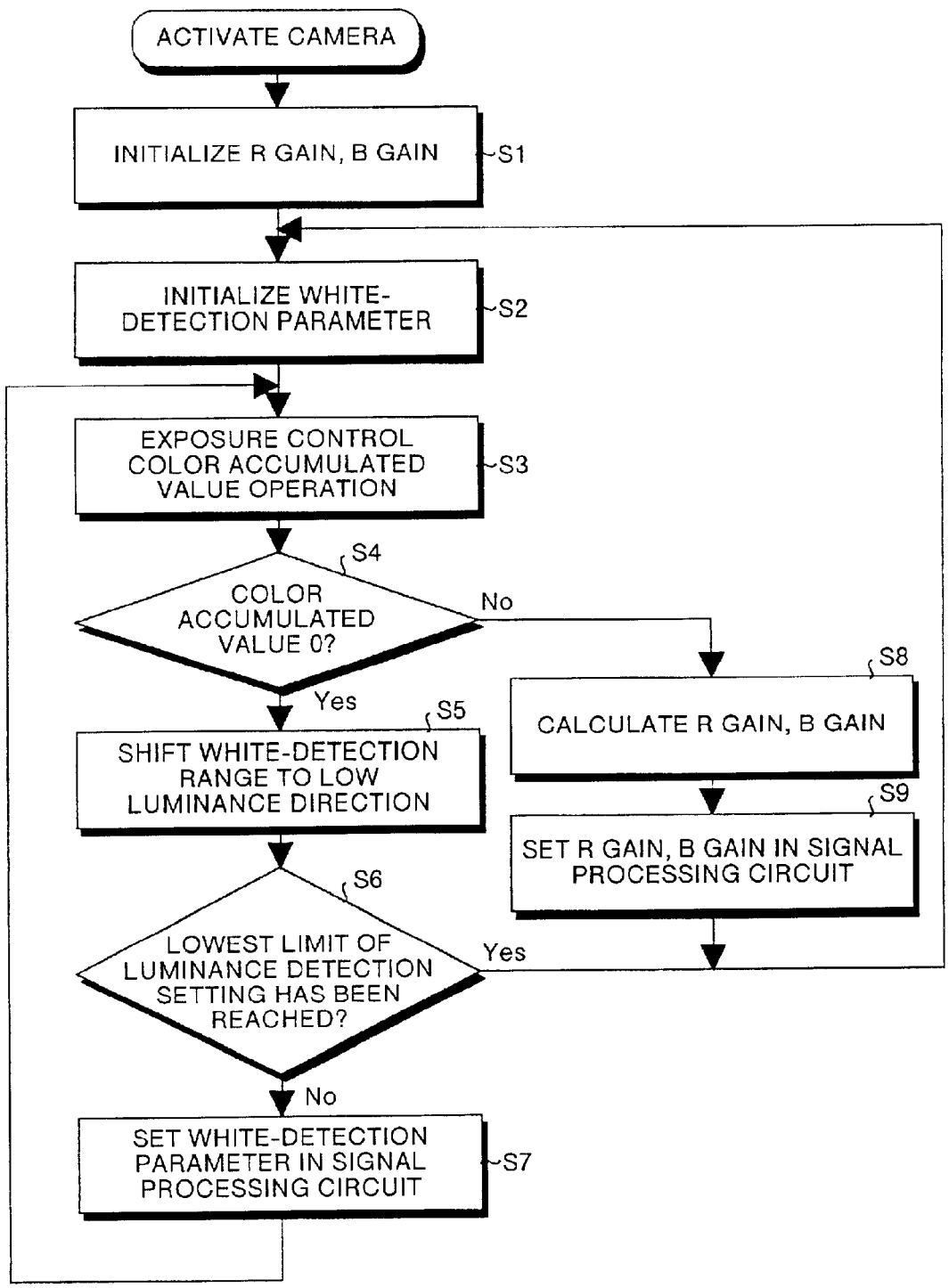
FIG. 7 is a flow chart that explains the white-balance adjusting method in the digital camera of FIG. 1.
Figure 8:
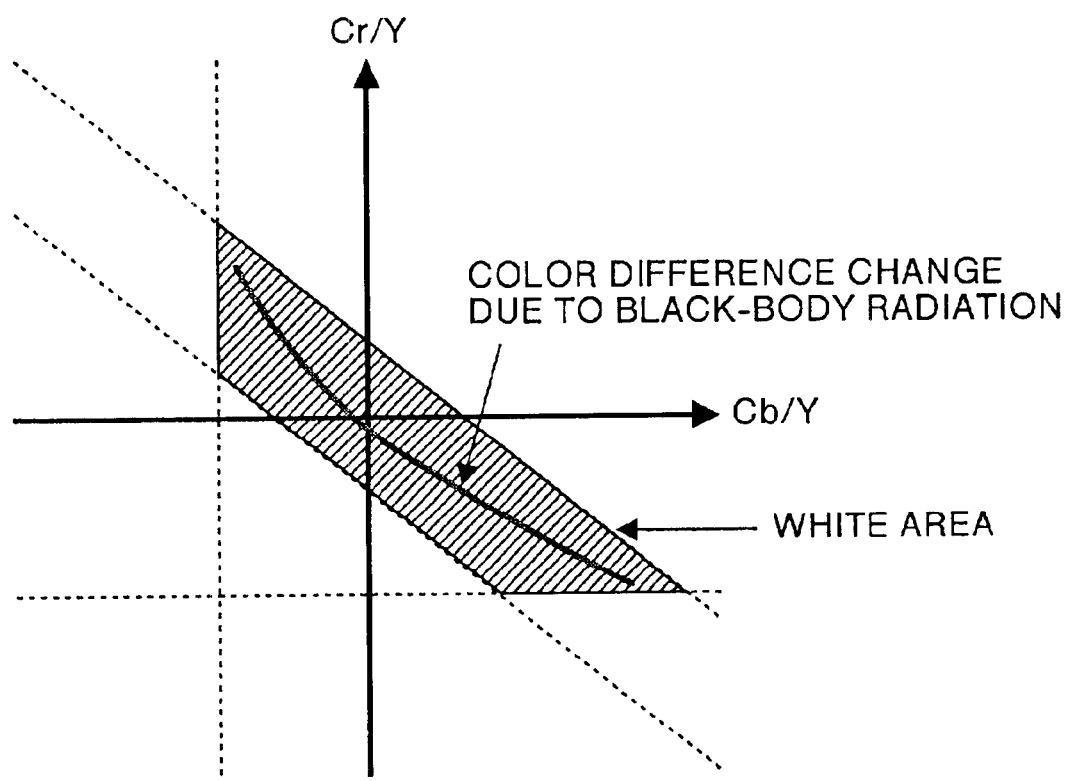
FIG. 8 is a drawing that explains the conventional white-detection method.

Next, referring to a flow chart in FIG. 7, an explanation will be given of a white-balance adjusting method in the digital camera in FIG. 1. FIG. 7 is a flow chart that explains the white balance adjusting method of the digital camera of FIG. 1.

When the camera is activated by turning the power supply on, the controller 6 initializes the R gain and B gain of the white-balance adjusting circuit 12 of the signal processing circuit 4 to reference values that are appropriate values with respect to sun light, etc. (step S1). Next, the controller 6 initializes the white-detection parameters of the white-detection circuit 14 in the signal processing circuit 4, Y_min (Y lowermost value), Y_max (Y uppermost value), R-G_min (R-G lowermost value), R-G_max (R-G uppermost value), B-G_min (B-G lowermost value) and B-G_max (B-G uppermost value), to the high luminance areas as described above (step S2). Thereafter, an exposure controlling process is carried out so that image data is acquired through the optical mechanism 1, CCD-CDS circuit 2, etc., and the white-detection circuit 14 of the signal processing circuit 4 carries out a white-detection process on the acquired image data to calculate the color accumulated values, ΣR, ΣG, ΣB, and outputs the resulting values to the controller 6 (step S3).

The controller 6 makes a judgment as to whether or not the color accumulated values, ΣR, ΣG, ΣB, input from the white-detection circuit 14, are "0" (step S4), and when the color accumulated values, ΣR, ΣG, ΣB, are "0", the sequence proceeds to step S5; in contrast, when the color accumulated values, ΣR, ΣG, ΣB, are not "0", the sequence proceeds to step S8.

At step S5, in the case when the color accumulated values, ΣR, ΣG, ΣB, are "0", the controller 6 shifts the luminance detection range of the white-detection range in the low luminance direction as described above, thereby calculating the white-detection parameters, Y_min (Y lowermost value), Y_max (Y uppermost value), R-G_min (R-G lowermost value), R-G_max (R-G uppermost value), B-G_min (B-G lowermost value) and B-G_max (B-G uppermost value), with a narrowed color difference detection range. Then, among the white-detection parameters thus calculated, the controller 6 makes a judgment as to whether or not the luminance detection range, Y_min (Y lowermost value), Y_max (Y uppermost value), has reached the lower limit (step S6), and in the case when the judgment shows that the luminance detection range has reached the lower limit, the sequence proceeds to step S2, thereby resetting the white-detection parameters to the initial state. In contrast, at step S6, in the case when the judgment shows that the luminance detection range of the white-detection parameters, Y_min (Y lowermost value), Y_max (Y uppermost value), has not reached the lower limit, the sequence proceeds to the step S7 at which the white-detection parameters, Y_min (Y lowermost value), Y_max (Y uppermost value), R-G_min (R-G lowermost value), R-G_max (R-G uppermost value), B-G_min (B-G lowermost value) and B-G_max (B-G uppermost value), which have been calculated at step S5, are set in the white-detection circuit 14 in the signal processing circuit 4 so that the sequence returns to step S3, thereby carrying out the next exposing control.

In contrast, in the case when the color accumulated values, ΣR, ΣG, ΣB, are not "0", at step S8, the controller 6 calculates the values of the R gain and B gain in the white balance adjusting circuit 12 of the signal processing circuit 4 based upon the color accumulated values, ΣR, ΣG, ΣB. Thereafter, the controller 6 sets the values of the R gain and B gain thus calculated in the white balance adjusting circuit 12 of the signal processing circuit 4 (step S9), and the sequence then proceeds to step S2 at which the white-detection parameters are reset to the initial state, thereby repeating the same processes. In this manner, the controller 6 carries out a feed-back controlling operation by repeating the above processes, thereby carrying out a white-balance adjusting process.

As described above, in the present embodiment, the white-balance adjusting circuit 12 executes a white-balance adjusting process by adjusting gains of R, B image data of the color image data, the white-detection circuit 14 detects pixels that are located within a range of presettable white-detection parameters from the color image data that have been subjected to the white-balance adjusting process, and accumulates the image data of the pixels of respective colors that have been detected so as to output the resulting color accumulated values, ΣR, ΣG, ΣB, for the respective colors, the controller 6 calculates white-detection parameters that form the narrowest range with the highest luminance under a condition that the color accumulated values, ΣR, ΣG, ΣB, of the respective colors are not reduced to "0", and sets the resulting parameter in the white-detection circuit 14, and based upon the color accumulated values, ΣR, ΣG, ΣB, of the respective colors that are output in the case when the white-detection parameters that form the narrowest range with the highest luminance under the condition that the color accumulated values, ΣR, ΣG, ΣB, of the respective colors are not reduced to "0" have been preset in the white-detection circuit 14, calculates the gains of R and B of the white-balance adjusting circuit 12, and sets the resulting gains in the white-balance adjusting circuit 12 so as to carry out a feed-back controlling process; therefore, the R gain and B gain used for adjusting the white-balance are determined by using the color-accumulated values that have been white-detected within the limited area with high luminance within the screen, and even in the case of a scene having chromatic color subjects in a mixed manner that correspond to color offsets due to white and color temperature changes along the black-body radiation, it is possible to carry out a white-balance adjustment that is less susceptible to errors, without having adverse effects from the colored areas. In other words, among achromatic color areas within the screen, high luminance areas that are most likely to be white are automatically retrieved, and the color-difference accumulated values as the results of the white-detection process are utilized; therefore, it is possible to prevent adverse effects from the chromatic color subjects, such as skin colors, that tend to cause errors.

Moreover, the controller 6 sets a luminance detection region of the white-detection parameters with respect to the white-detection circuit 14 at the narrowest area with the highest luminance during the initial setting time upon starting the controlling process, and in the case when the color accumulated values, ΣR, ΣG, ΣB, of the white-detection circuit 14 are "0", allows the luminance detection area of the white-detection parameters to shift toward the low luminance side with a predetermined width so that the white-detection parameters are fed back to the white-detection circuit 14 so as to allow the white-detection circuit 14 to detect the pixel having the highest luminance within the screen; therefore, in the case when no high luminance area exist within the screen, the retrieving process is successively carried out while the luminance area of the white-detection is shifted in the low luminance direction, and based upon the color accumulated values that have been white-detected at the area having the highest luminance, the white-balance adjustment is carried out, and even in the case when no white areas exist within the screen, it is possible to carry out an appropriate white-balance adjusting process when there is any colored area.

Moreover, in the case when, upon allowing the white-detection parameters of the white-detection circuit 14 to shift toward the low luminance side, the color accumulated values, ΣR, ΣG, ΣB, G of the white-detection circuit 14 become no longer "0" and the luminance detection region of the white-detection parameters has reached the presettable lowest value, the controller 6 resets them to the initially set white-detection parameters (with the luminance detection range being set to the narrow area corresponding to the highest luminance). Therefore, even if a achromatic color area is detected in the intermediate luminance detection range, or in the case when achromatic color areas do not exist within the screen even after the retrieval has been made to the lower limit value within the presettable range in the luminance detection range, the resetting operation of the white-detection parameters to the high luminance area and the retrieving process in the low luminance direction are continued, and immediately after white area having a high luminance has come to be contained in the screen as the image angle varies, operations of the gain setting values are carried out by using the color accumulated values within the area. Thus, it is possible to always carry out a white-balance adjustment that is least susceptible to errors with respect to the pick-up screen.

With respect to the white balance adjusting method for the image processing device in accordance with the above embodiment, a preliminarily prepared program may be executed by a computer such as a workstation and a personal computer. This program is executed after having been read from a computer readable recording medium such as a hard disk, a floppy disk, a CD-ROM, an MO and a DVD. Moreover, this program can be distributed through the above recording medium, or can be distributed through a network such as the Internet as a transferring medium.

Moreover, the present invention is not intended to be limited by the above embodiment, and can be modified on demand within the range in which no change is made in the jest of the present invention. For example, the gains of R and B are adjusted in the white balance adjusting circuit 12 in the above embodiment; however, the present invention is not intended to be limited by this arrangement, and at least not less than two of R, G and B may be combined and gain-adjusted.

Moreover, the image processing device and the white-balance adjusting method of the present invention may be widely applied to image-pickup devices used in video cameras, digital cameras, etc.

As described above, in accordance with the image processing device according to one aspect of this invention, the white-balance adjusting unit executes a white-balance adjusting process by adjusting gains of at least image data of two colors of the color image data, the white-detection unit detects pixels that are located within a range of a presettable white-detection parameter from the color image data that have been subjected to the white-balance adjusting process, and accumulates the image data of the pixels of each color that have been detected so as to output the resulting accumulated value for each color, the white-detection parameter setting unit calculates a white-detection parameter that sets the narrowest area with the highest luminance under a condition that the accumulated value of each color is not reduced to "0", and sets the resulting parameter in the white-detection unit, and the white-balance control unit calculates gain values of at least two colors of the gain-adjusting unit so as to feed-back control the gain-adjusting unit by setting the resulting values in the gain-adjusting unit, based upon the accumulated value for each of the colors in the case when the white-detection parameter that sets the narrowest area with the highest luminance under the condition that the accumulated value of each color is not reduced to "0" has been preset in the white-detection unit. Therefore, the R gain and B gain used for adjusting the white-balance are determined by using the color-accumulated values that have been white-detected within the limited area with high luminance within the screen, and even in the case of a scene having chromatic color subjects in a mixed manner that correspond to color offsets due to white and color temperature changes along the black-body radiation, it is possible to carry out a white-balance adjustment that is less susceptible to errors, without having adverse effects from the colored areas.

Furthermore, the white-detection parameter setting unit sets a luminance detection region of the white-detection parameter at the narrowest area with the highest luminance during the initial setting time, and in the case when the accumulated value of each color is "0", allows the luminance detection area of the white-detection parameter to shift toward the low luminance side with a predetermined width so that the white-detection unit is feed-back controlled so as to detect the pixel having the highest luminance within the screen. Therefore, in the case when no high luminance area exist within the screen, the retrieving process is successively carried out while the luminance area of the white-detection is shifted in the low luminance direction, and based upon the color accumulated values that have been white-detected at the area having the highest luminance, the white-balance adjustment is carried out, and even in the case when no white areas exist within the screen, it is possible to carry out an appropriate white-balance adjusting process when there is any colored area.

Furthermore, in the case when, upon allowing the luminance detection region of the white-detection parameter to shift toward the low luminance side, the accumulated value of each color becomes no longer "0" or the luminance detection region of the white-detection parameter has reached the lowest value, the white-detection parameter is reset to the parameter at the time of initial setting. Therefore, even in the case when any achromatic color area is detected in the intermediate luminance detection range, or in the case when achromatic color areas do not exist within the screen even after the retrieval has been made to the lower limit value within the presettable range in the luminance detection range, the resetting operation of the white-detection range to the high luminance area and the retrieving process in the low luminance direction are continued, and immediately after white area having a high luminance has come to be contained in the screen as the image angle varies, operations of the gain setting values are carried out by using the color accumulated values within the area; thus, it is possible to always carry out a white-balance adjustment that is least susceptible to errors with respect to the pick-up screen.

Moreover, in accordance with the white-balance adjusting method of another aspect of this invention, a white-balance adjusting process is carried outby adjusting gains of at least image data of two colors of the color image data; from the color image data that have been subjected to the white-balance adjusting process, pixels that are located within a range of a presettable white-detection parameter are detected; the image data of the pixels of each color that have been detected are totalized so as to output the resulting accumulated value for each color; a white-detection parameter that sets the narrowest area with the highest luminance under a condition that the accumulated value of each color is not reduced to "0" is calculated, and the resulting parameter is set; and based upon the accumulated value for each of the colors in the case when the white-detection parameter that sets the narrowest area with the highest luminance under the condition that the accumulated value of each color is not reduced to "0" has been set, gain values of at least two colors and calculated, and the resulting values are set so as to carry out a feed-back control process. Therefore, the R gain and B gain used for adjusting the white-balance are determined by using the color-accumulated values that have been white-detected within the limited area with high luminance within the screen, and even in the case of a scene having chromatic color subjects in a mixed manner that correspond to color offsets due to white and color temperature changes along the black-body radiation, it is possible to carry out a white-balance adjustment that is less susceptible to errors, without having adverse effects from the colored areas.

Moreover, in accordance with the white-balance adjusting method of still another aspect of this invention, at the time of initial setting, a parameter of a luminance detection region of a white-detection parameter is set to a narrow area corresponding to the highest luminance; a white-balance adjusting process is executed by adjusting gains of at least image data of two colors of the color image data; from the color image data that have been subjected to the white-balance adjusting process, pixels that are located within a range of a presettable white-detection parameter are detected, and the image data of the pixels of each color that have been detected are totalized so as to output the resulting accumulated value for each color; a white-detection parameter that sets the narrowest area with the highest luminance is calculated under a condition that the accumulated value of each color is not reduced to "0", and the resulting parameter is set; based upon the accumulated value for each of the colors in the case when the white-detection parameter that sets the narrowest area with the highest luminance under the condition that the accumulated value of each color is not reduced to "0" has been set, gain values of at least two colors are calculated and the resulting values are set so as to carry out a feed-back control process; and in the case when the accumulated value of each color is "0", the luminance detection area of the white-detection parameter is allowed to shift toward the low luminance side with a predetermined width. Therefore, in the case when no high luminance area exist within the screen, the retrieving process is successively carried out while the luminance area of the white-detection is shifted in the low luminance direction, and based upon the color accumulated values that have been white-detected at the area having the highest luminance, the white-balance adjustment is carried out, and even in the case when no white areas exist within the screen, it is possible to carry out an appropriate white-balance adjusting process when there is any colored area.

Moreover, in accordance with the white-balance adjusting method of still another aspect of this invention, at the time of initial setting, a parameter of a luminance detection region of a white-detection parameter is set to a narrow area corresponding to the highest luminance; a white-balance adjusting process is executed by adjusting gains of at least image data of two colors of the color image data; from the color image data that have been subjected to the white-balance adjusting process, pixels that are located within a range of a presettable white-detection parameter are detected, and the image data of the pixels of each color that have been detected are totalized so as to output the resulting accumulated value for each color; a white-detection parameter that sets the narrowest area with the highest luminance is calculated under a condition that the accumulated value of each color is not reduced to "0", and the resulting parameter is set; based upon the accumulated value for each of the colors in the case when the white-detection parameter that sets the narrowest area with the highest luminance under the condition that the accumulated value of each color is not reduced to "0" has been set, gain values of at least two colors are calculated and the resulting values are set so as to carry out a feed-back control process; in the case when the accumulated value of each color is "0", the luminance detection area of the white-detection parameter is allowed to shift toward the low luminance side with a predetermined width; and in the case when the accumulated value of each color becomes no longer "0" or the luminance detection region of the white-detection parameter has reached the lowest value, the white-detection parameter is reset to the parameter at the time of initial setting. Therefore, even in the case when any achromatic color area is detected in the intermediate luminance detection range, or in the case when achromatic color areas do not exist within the screen even after the retrieval has been made to the lower limit value within the presettable range in the luminance detection range, the resetting operation of the white-detection parameters to the high luminance area and the retrieving process in the low luminance direction are continued, and immediately after white area having a high luminance has come to be contained in the screen as the image angle varies, operations of the gain setting values are carried out by using the color accumulated values within the area; thus, it is possible to always carry out a white-balance adjustment that is least susceptible to errors with respect to the pick-up screen.

Moreover, in accordance with the recording medium still another aspect of this invention stores a computer program which is executed by a computer so that the respective processes according to the invention are realized. Therefore, the R gain and B gain used for adjusting the white-balance are determined by using the color accumulated values that have been white-detected within the limited area with high luminance within the screen, and even in the case of a scene having chromatic color subjects in a mixed manner that correspond to color offsets due to white and color temperature changes along the black-body radiation, it is possible to carry out a white-balance adjustment that is less susceptible to errors, without having adverse effects from the colored areas.

The present document incorporates by reference the entire contents of Japanese priority document, 2000-200270 filed in Japan on Jun. 30, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing device which adjusts white balance by adjusting a gain of input color image data, comprising:
    a white-balance adjusting unit which executes a white-balance adjusting process by adjusting gains of at least image data of two colors of the color image data;
    a white-detection unit which, from the color image data that have been subjected to the white-balance adjusting process, detects pixels that are located within a range of a presettable white-detection parameter, and accumulates the image data of the pixels of each color that have been detected so as to output the resulting accumulated value for each color;
    a white-detection parameter setting unit which calculates a white-detection parameter that sets the narrowest area with the highest luminance under a condition that the accumulated value of each color is not reduced to "0", and sets the resulting parameter in the white-detection unit; and
    a white-balance control unit which, based upon the accumulated value for each of the colors in the case when the white-detection parameter that sets the narrowest area with the highest luminance under the condition that the accumulated value of each color is not reduced to "0" has been preset in the white-detection unit, calculates gain values of at least two colors of the white-balance adjusting unit so as to feed-back control the white-balance adjusting unit by setting the resulting values in the white-balance adjusting unit.

2. The image processing device according to claim 1, wherein said white-detection parameter setting unit sets a luminance detection region of the white-detection parameter at the narrowest area with the highest luminance during the initial setting time, and in the case when the accumulated value of each color is "0", allows the luminance detection area of the white-detection parameter to shift toward the low luminance side with a predetermined width so that the white-detection unit is feed-back controlled so as to detect the pixel having the highest luminance within the screen.

3. The image processing device according to claim 2, wherein, in the case when, upon allowing the luminance detection region of the white-detection parameter to shift toward the low luminance side, the accumulated value of each color becomes no longer "0" or the luminance detection region of the white-detection parameter has reached the lowest value, said white-detection parameter setting unit resets the white-detection parameter to the parameter at the time of initial setting.

4. A method of adjusting white-balance by adjusting a gain of input color image data, the method comprising the steps of:
    adjusting white-balance by adjusting gains of at least image data of two colors of the color image data;
    from the color image data that have been subjected to the white-balance adjusting process, detecting pixels that are located within a range of a presettable white-detection parameter, and accumulating the image data of the pixels of each color that have been detected so as to output the resulting accumulated value for each color;
    calculating a white-detection parameter that sets the narrowest area with the highest luminance under a condition that the accumulated value of each color is not reduced to "0", and setting the resulting parameter; and
    based upon the accumulated value for each of the colors in the case when the white-detection parameter that sets the narrowest area with the highest luminance under the condition that the accumulated value of each color is not reduced to "0" has been set, calculating gain values of at least two colors and setting the resulting values so as to carry out a feed-back control process.

5. A method of adjusting white-balance by adjusting a gain of input color image data, the method comprising the steps of:
    at the time of initial setting, setting a parameter of a luminance detection region of a white-detection parameter to a narrow area corresponding to the highest luminance;
    executing a white-balance adjusting process by adjusting gains of at least image data of two colors of the color image data;
    from the color image data that have been subjected to the white-balance adjusting process, detecting pixels that are located within a range of a presettable white-detection parameter, and accumulating the image data of the pixels of each color that have been detected so as to output the resulting accumulated value for each color;

calculating a white-detection parameter that sets the narrowest area with the highest luminance under a condition that the accumulated value of each color is not reduced to "0", and setting the resulting parameter;

based upon the accumulated value for each of the colors in the case when the white-detection parameter that sets the narrowest area with the highest luminance under the condition that the accumulated value of each color is not reduced to "0" has been set, calculating gain values of at least two colors and setting the resulting values so as to carry out a feed-back control process; and in the case when the accumulated value of each color is "0", allowing the luminance detection area of the white-detection parameter to shift toward the low luminance side with a predetermined width.

6. A method of adjusting white-balance by adjusting a gain of input color image data, the method comprising the steps of:

at the time of initial setting, setting a parameter of a luminance detection region of a white-detection parameter to a narrow area corresponding to the highest luminance;

executing a white-balance adjusting process by adjusting gains of at least image data of two colors of the color image data;

from the color image data that have been subjected to the white-balance adjusting process, detecting pixels that are located within a range of a presettable white-detection parameter, and accumulating the image data of the pixels of each color that have been detected so as to output the resulting accumulated value for each color;

calculating a white-detection parameter that sets the narrowest area with the highest luminance under a condition that the accumulated value of each color is not reduced to "0", and setting the resulting parameter;

based upon the accumulated value for each of the colors in the case when the white-detection parameter that sets the narrowest area with the highest luminance under the condition that the accumulated value of each color is not reduced to "0" has been set, calculating gain values of at least two colors and setting the resulting values so as to carry out a feed-back control process;

in the case when the accumulated value of each color is "0", allowing the luminance detection area of the white-detection parameter to shift toward the low luminance side with a predetermined width; and in the case when the accumulated value of each color becomes no longer "0" or the luminance detection region of the white-detection parameter has reached the lowest value, resetting the white-detection parameter to the parameter at the time of initial setting.

7. A computer readable medium for storing instructions, which when executed on a computer, causes the computer to perform the steps of:

adjusting white-balance by adjusting gains of at least image data of two colors of the color image data;

from the color image data that have been subjected to the white-balance adjusting process, detecting pixels that are located within a range of a presettable white-detection parameter, and accumulating the image data of the pixels of each color that have been detected so as to output the resulting accumulated value for each color;

calculating a white-detection parameter that sets the narrowest area with the highest luminance under a condition that the accumulated value of each color is not reduced to "0", and setting the resulting parameter; and based upon the accumulated value for each of the colors in the case when the white-detection parameter that sets the narrowest area with the highest luminance under the condition that the accumulated value of each color is not reduced to "0" has been set, calculating gain values of at least two colors and setting the resulting values so as to carry out a feed-back control process.

8. A computer readable medium for storing instructions, which when executed on a computer, causes the computer to perform the steps of: at the time of initial setting, setting a parameter of a luminance detection region of a white-detection parameter to a narrow area corresponding to the highest luminance;

executing a white-balance adjusting process by adjusting gains of at least image data of two colors of the color image data;

from the color image data that have been subjected to the white-balance adjusting process, detecting pixels that are located within a range of a presettable white-detection parameter, and accumulating the image data of the pixels of each color that have been detected so as to output the resulting accumulated value for each color;

calculating a white-detection parameter that sets the narrowest area with the highest luminance under a condition that the accumulated value of each color is not reduced to "0", and setting the resulting parameter;

based upon the accumulated value for each of the colors in the case when the white-detection parameter that sets the narrowest area with the highest luminance under the condition that the accumulated value of each color is not reduced to "0" has been set, calculating gain values of at least two colors and setting the resulting values so as to carry out a feed-back control process;

in the case when the accumulated value of each color is "0", allowing the luminance detection area of the white-detection parameter to shift toward the low luminance side with a predetermined width; and in the case when the accumulated value of each color becomes no longer "0" or the luminance detection region of the white-detection parameter has reached the lowest value, resetting the white-detection parameter to the parameter at the time of initial setting.

9. A computer readable medium for storing instructions, which when executed on a computer, causes the computer to perform the steps of:

at the time of initial setting, setting a parameter of a luminance detection region of a white-detection parameter to a narrow area corresponding to the highest luminance;

executing a white-balance adjusting process by adjusting gains of at least image data of two colors of the color image data;

from the color image data that have been subjected to the white-balance adjusting process, detecting pixels that are located within a range of a presettable white-detection parameter, and accumulating the image data of the pixels of each color that have been detected so as to output the resulting accumulated value for each color;

calculating a white-detection parameter that sets the narrowest area with the highest luminance under a condition that the accumulated value of each color is not reduced to "0", and setting the resulting parameter;

based upon the accumulated value for each of the colors in the case when the white-detection parameter that sets the narrowest area with the highest luminance under the condition that the accumulated value of each color is not reduced to "0" has been set, calculating gain values of at least two colors and setting the resulting values so as to carry out a feed-back control process;

in the case when the accumulated value of each color is "0", allowing the luminance detection area of the white-detection parameter to shift toward the low luminance side with a predetermined width; and in the case when the accumulated value of each color becomes no longer "0" or the luminance detection region of the white-detection parameter has reached the lowest value, resetting the white-detection parameter to the parameter at the time of initial setting.

* * * * *